US 9,082,449 B2

(12) United States Patent
Kumaki (10) Patent No.: US 9,082,449 B2
(45) Date of Patent: Jul. 14, 2015

(54) DISK DRIVE DEVICE WITH STRUCTURE THAT ENABLES THINNING AND INCREASE OF RECORDING CAPACITY

(71) Applicant: SAMSUNG ELECTRO-MECHANICS JAPAN ADVANCED TECH. CO. LTD., Fujieda, Shizuoka Prefecture (JP)

(72) Inventor: Mikie Kumaki, Kakegawa (JP)

(73) Assignee: SAMSUNG ELECTRO-MECHANICS JAPAN ADVANCED TECHNOLOGY CO., LTD., Fujieda, Shizuoka Prefecture (JP)

( * ) Notice: Subject to any disclaimer, the term of this patent is extended or adjusted under 35 U.S.C. 154(b) by 0 days.

(21) Appl. No.: 14/288,050

(22) Filed: May 27, 2014

(65) Prior Publication Data

US 2014/0355155 A1 Dec. 4, 2014

(30) Foreign Application Priority Data

May 30, 2013 (JP) .................................. 2013-113784
Jun. 14, 2013 (JP) .................................. 2013-125109

(51) Int. Cl.
*G11B 19/20* (2006.01)
*F16C 33/74* (2006.01)
*F16C 17/10* (2006.01)

(52) U.S. Cl.
CPC ............ *G11B 19/2036* (2013.01); *F16C 33/74* (2013.01); *F16C 17/107* (2013.01)

(58) Field of Classification Search
CPC ........... G11B 19/2009; G11B 19/2036; G11B 25/043; F16C 2370/12; F16C 17/107; F16C 33/745; F16C 33/1085; H02K 7/086; H02K 5/1677; H02K 21/22

USPC .......... 360/99.08, 98.07, 99.04; 310/67 R, 90
See application file for complete search history.

(56) References Cited

U.S. PATENT DOCUMENTS

| 5,214,326 | A  | * | 5/1993  | Yonei ........................... 310/67 R |
| 5,533,811 | A  |   | 7/1996  | Polch et al. |
| 5,600,514 | A  | * | 2/1997  | Fukuzawa ................... 360/99.08 |
| 6,038,205 | A  | * | 3/2000  | Katakura et al. .............. 369/266 |
| 6,195,226 | B1 | * | 2/2001  | Papst ......................... 360/99.08 |
| 6,991,376 | B2 | * | 1/2006  | Aiello et al. ................... 384/107 |
| 8,724,257 | B2 | * | 5/2014  | Sekii et al. ................. 360/99.08 |
| 2011/0019303 | A1 | * | 1/2011  | Yamada et al. ................. 360/55 |
| 2011/0279925 | A1 | * | 11/2011 | Watanabe et al. .......... 360/99.08 |

(Continued)

FOREIGN PATENT DOCUMENTS

| JP | 9-512330 A    | 12/1997 |
| JP | 2000-050593 A | 2/2000  |
| JP | 2008-275074 A | 11/2008 |

(Continued)

*Primary Examiner* — Brian Miller
(74) *Attorney, Agent, or Firm* — Holtz, Holtz, Goodman & Chick PC (57) ABSTRACT

A disk drive device includes: a chassis; an annular hub on which a recording disk is to be mounted; a fluid dynamic bearing mechanism that supports the hub freely rotatable relative to the chassis; an annular extended portion extending outwardly in a radial direction from the hub; and an annular recess which is provided in the chassis and where the annular extended portion at least partially enters in the radial direction, in which a gap between the annular recess and the annular extended portion includes a portion that forms a flexed labyrinth in a cross-sectional view.

19 Claims, 2 Drawing Sheets

(56) References Cited

U.S. PATENT DOCUMENTS

2012/0212092 A1* 8/2012 Goto et al. .................. 310/90
2012/0288222 A1* 11/2012 Parsoneault et al. .......... 384/107

FOREIGN PATENT DOCUMENTS

| JP | 2009-176369 A | 8/2009 |
|----|---------------|--------|
| WO | WO 96/25606 A | 8/1996 |

* cited by examiner

DISK DRIVE DEVICE WITH STRUCTURE THAT ENABLES THINNING AND INCREASE OF RECORDING CAPACITY

BACKGROUND OF THE INVENTION

1. Field of the Invention

The present disclosure relates to a disk drive device including a fluid dynamic bearing mechanism.

2. Description of the Related Art

Recently, disk drive devices like hard disk drives are generally built with a fluid dynamic bearing mechanism that enables a stable and fast-speed rotation of a disk. For example, JP 2008-275074 A discloses a motor including a dynamic pressure bearing, and this motor has a lubricant filled between a sleeve forming apart of a stator and a shaft forming a part of a rotor. Dynamic pressure generated by the lubricant supports the rotor in a non-contact manner, enabling a smooth and fast-speed rotation.

Conversely, there is a demand for disk drive devices to further increase a large recording capacity. In order to satisfy such a demand, a recording density can be increased.

To increase the recording density, a gap between a recording/playing head and a disk surface can be reduced. When, however, this gap is too narrow, if slight particles stick to the disk surface, it becomes difficult for the recording/playing head to precisely trace tracks on the disk, resulting in a read/write failure. In the worst case, the recording/playing head is damaged, resulting in a malfunction of the disk drive devices.

One of the causes of such particles is vaporization of the lubricant in the fluid dynamic bearing mechanism due to a high-temperature environment inherent to a fast-speed rotation of the disk, i.e., a fast-speed rotation of the motor. The vaporized lubricant diffuses the interior of the disk drive devices, and is deposited on the disk surface, thereby forming a condensation.

As to the high-temperature environment, the temperature of the usage atmosphere of the disk drive devices is increasing due to downsizing, and there is a demand to enable the use of the disk drive devices at a further higher temperature, e.g., an atmosphere temperature of equal to or higher than 85 degrees.

Still further, there is also a demand to increase a time until the lubricant is vaporized and dissipated, e.g., to ensure a longer product lifetime of equal to or longer than five years.

Concurrently, the disk drive devices are often built in portable electric devices recently, and there is a demand for thinning in such a case. In general, when the disk drive devices are made thin, the strength of the disk drive devices is reduced.

Therefore, the present disclosure has been made in view of the aforementioned circumstances, and it is an objective of the present disclosure to provide a disk drive device which can address the technical problem originating from thinning, while at the same time, can further increase a large recording capacity.

SUMMARY OF THE INVENTION

To accomplish the above objective, a disk drive device according to an aspect of the present disclosure includes: a chassis; an annular hub on which a recording disk is to be mounted; a fluid dynamic bearing mechanism that supports the hub freely rotatable relative to the chassis; an annular extended portion extending outwardly in a radial direction from the hub; and an annular recess which is provided in the chassis and where the annular extended portion at least partially enters in the radial direction, in which a gap between the annular recess and the annular extended portion includes a portion that forms a flexed labyrinth in a cross-sectional view.

To accomplish the above objective, a disk drive device according to another aspect of the present disclosure includes: a chassis; an annular hub on which a recording disk is to be mounted; a fluid dynamic bearing mechanism that supports the hub freely rotatable relative to the chassis; an annular extended portion extending outwardly in a radial direction from the hub; and an annular recess which is provided in the chassis and where the annular extended portion at least partially enters in the radial direction, in which: the hub includes a disk portion in a disk shape extending outwardly in a radial direction relative to a center axis of the fluid dynamic bearing mechanism, and, an annular portion formed as a separate annular component from the disk portion and extending toward the chassis in an axial direction from an outer circumference of the disk portion; a joined face of either one of the disk portion and the annular portion is formed with a step extending in the radial direction; and another joined face of the disk portion or the annular portion is provided with a catching part that abuts the step.

Any combination of the aforementioned components is also within the scope and spirit of the present disclosure.

DETAILED DESCRIPTION OF THE PREFERRED EMBODIMENTS

Preferred embodiments of the present disclosure will be explained below with reference to the accompanying drawings. The same or corresponding structural element and component illustrated in respective figures will be denoted by the same reference numeral, and the duplicated explanation thereof will be omitted accordingly. The dimension of the component illustrated in the respective figures is enlarged or scaled down as needed to facilitate understanding to the present disclosure. In addition, a part of the component in the respective figures that is not relevant to the explanation of the embodiments will be omitted.

A disk drive device according to an embodiment is suitably applied as a disk drive device like a hard disk drive which has a magnetic recording disk that magnetically records data, and which rotates and drives such a disk.

For example, this disk drive device includes a rotating body that is attached to a stationary body in a freely rotatable manner via a bearing. The rotating body includes a loader that can load thereon a drive-target media like a magnetic recording disk.

The bearing includes, for example, a radial bearing and a thrust bearing. As an example, the thrust bearing is located outwardly in the radial direction relative to the radial bearing.

The radial bearing and the thrust bearing may be each a fluid bearing that generates dynamic pressure to a lubrication medium like a lubricant present between a shaft body and a bearing body.

Still further, this disk drive device includes a rotating driver that applies rotation torque to the rotating body. This rotating driver is, for example, a brush-less spindle motor. This rotating driver includes, for example, coils and a magnet.

Embodiment

Figure 1:
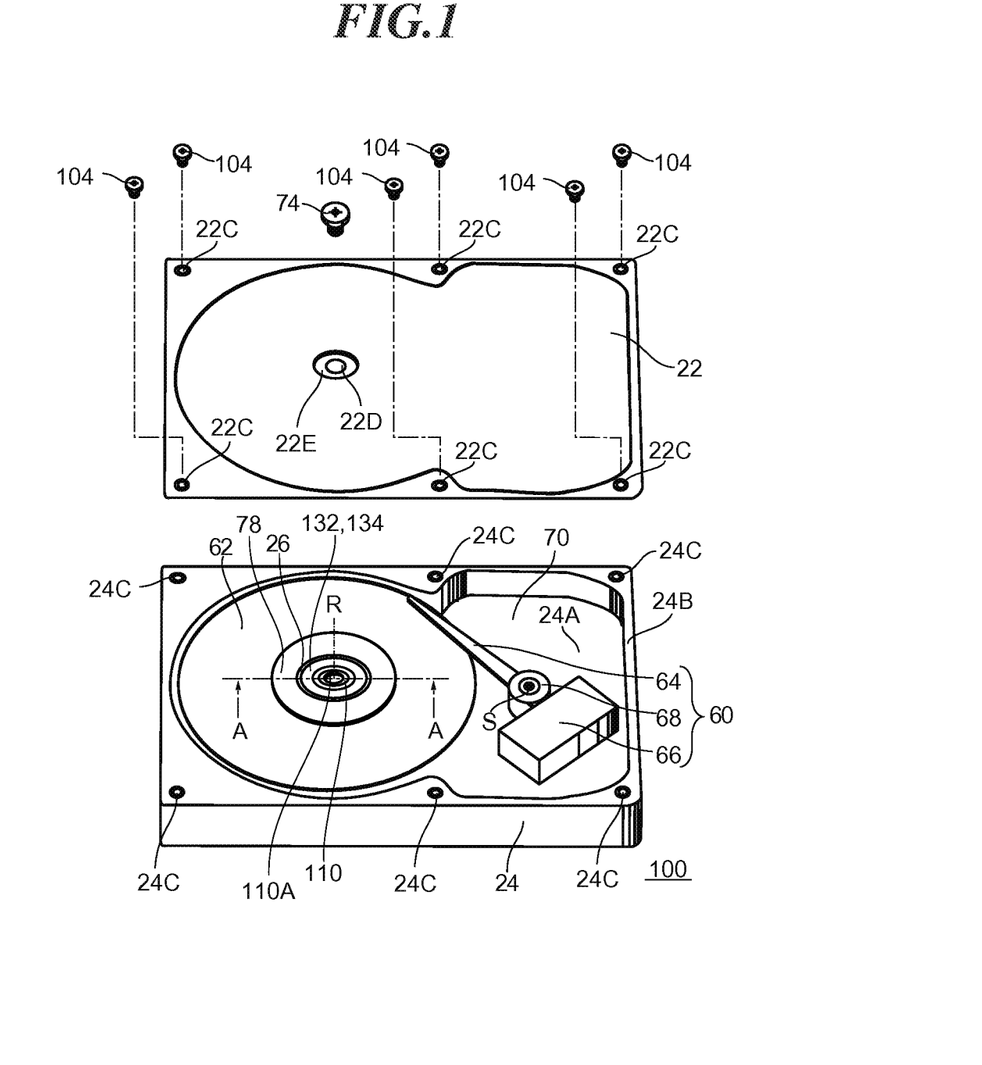
FIG. 1 is an exploded perspective view illustrating a disk drive device according to an embodiment of the present disclosure.
Figure 2:
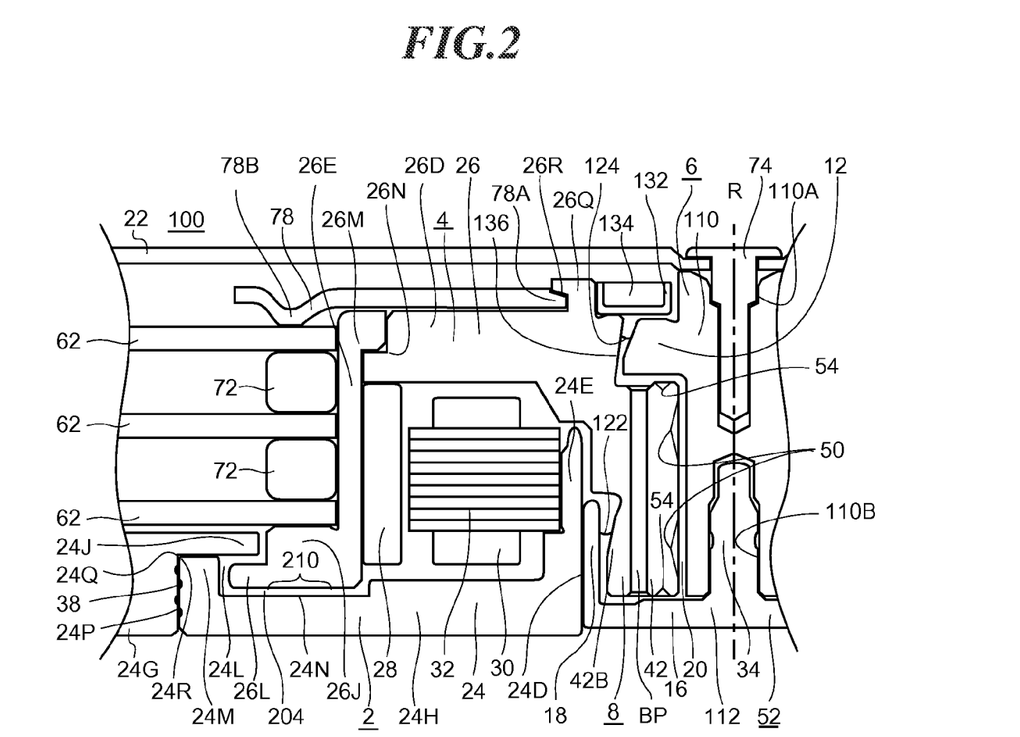
FIG. 2 is a cross-sectional view taken along a line A-A in FIG. 1.

FIG. 1 is a perspective view illustrating a disk drive device 100 according to this embodiment. FIG. 2 is a cross-sectional view taken along a line A-A in FIG. 1, and mainly illustrating the left side of a rotation axis R. FIG. 1 illustrates a condition in which a top cover 22 is detached in order to facilitate understanding to the present disclosure. Components not important to explain this embodiment are omitted in FIG. 1. The disk drive device 100 includes a chassis 24, a shaft 110, a rotator (e.g., a hub) 26, magnetic recording disks 62, a ring 132, a capturer 134, a clamper 78, a data reader/writer 60, the top cover 22, a center screw 74, and for example, six peripheral screws 104.

In the following explanation, a side at which the hub 26 is mounted relative to the chassis 24 will be defined as an upper side. In addition, a direction along the rotation axis R of the rotating body, an arbitrary direction passing through the rotation axis R on a plane perpendicular to the rotation axis R, and an arbitrary direction on such a plane will be defined as an axial direction, a radial direction, and a planar direction, respectively. The notations of such directions are not to limit the posture of the disk drive device 100 when in use, and the disk drive device 100 can be used in any arbitrary posture.

The magnetic recording disk 62 is, for example, a 2.5-inch magnetic recording disk having a diameter of 65 mm and formed of a glass, and, a diameter of a center hole thereof is 20 mm. If the magnetic recording disk 62 is made thin, the rigidity thereof decreases, and is warped when polished at the time of the manufacturing of the disk drive device 100, thereby reducing the processing flatness. Conversely, if the magnetic recording disk 62 is made thick, the weight increases. Regarding the magnetic recording disk 62, it is proven that if the thickness is within a range at least from 0.5 mm to 1.25 mm, the rigidity and the weight are practical. In this embodiment, the magnetic recording disk 62 has a thickness of from 0.7 mm to 0.9 mm, which mitigates a decrease of the processing flatness, thereby mitigating a reduction of the recording density. For example, three magnetic recording disks 62 are to be mounted on the hub 26, and are rotated together with the rotation of the hub 26. As will be discussed later, the magnetic recording disks 62 are fastened to the hub 26 by spacers 72 and a clamper 78.

The chassis 24 includes a bottom plate 24A that forms the bottom of the disk drive device 100, and an outer circumference wall 24B formed along the outer periphery of the bottom plate 24A so as to surround an area where the magnetic recording disks 62 are to be mounted. For example, six screw holes 24C are provided in the top face of the outer circumference wall 24B. Note that the chassis will be sometimes referred to as a base.

The data reader/writer 60 includes an unillustrated recording/playing head, a swing arm 64, a voice coil motor 66, and a pivot assembly 68. The recoding/playing head is attached to the tip of the swing arm 64, records data in the magnetic recording disk 62, or reads the data therefrom. The pivot assembly 68 supports the swing arm 64 in a swingable manner to the chassis 24 around a head rotating shaft S. The voice coil motor 66 allows the swing arm 64 to swing around the head rotating shaft S to move the recording/playing head to a desired location over the top face of the magnetic recording disk 62. The voice coil motor 66 and the pivot assembly 68 are configured by a conventionally well-known technology of controlling the position of a head.

The top cover 22 is a thin plate formed in a substantially rectangular shape, and has, for example, six screw through-holes 22C provided at the periphery of the top cover 22, a cover recess 22E, and a center hole 22D provided at the center of the cover recess 22E. The cover recess 22E is provided around the rotation axis R. The top cover 22 is formed by, for example, pressing an aluminum plate or an iron-steel plate into a predetermined shape. A surface processing like plating may be applied on the top cover 22 in order to suppress corrosion. The top cover 22 is fixed to the top face of the outer circumference wall 24B of the chassis 24 by, for example, the six peripheral screws 104. The six peripheral screws 104 correspond to the six screw through-holes 22C and the six screw holes 24C, respectively.

In particular, the top cover 22 and the top face of the outer circumference wall 24B are fixed with each other so as to suppress a leak into the interior of the disk drive device 100 from the joined portion of the top cover 22 and the top face of the outer circumference wall 24B. The interior of the disk drive device 100 is, more specifically, a disk retaining space 70 surrounded by the bottom plate 24A of the chassis 24, the outer circumference wall 24B of the chassis 24, and the top cover 22. This disk retaining space 70 is designed so as to be fully sealed, i.e., so as not to have a leak-in from the exterior and a leak-out to the exterior. The disk retaining space 70 is filled with clean gas having particles eliminated. Example clean gases are gas or air containing helium at a predetermined percentage. Hence, foreign materials like the particles are prevented from sticking to the magnetic recording disk 62 from the exterior of the disk retaining space 70, thereby improving the reliability of the operation of the disk drive device 100. The center screw 74 corresponds to a retainer hole 110A of the shaft 110. The top cover 22 is joined with the shaft 110 by causing the center screw 74 to pass all the way through the center hole 22D and to engaged with the retainer hole 110A in a screw manner.

The explanation will now be given with reference to FIG. 2.

FIG. 2 is a cross-sectional view taken along a line A-A in FIG. 1, and mainly illustrating the left side of the rotation axis R. A stationary body 2 includes a shaft body 6, a stator core 32, and coils 30. A rotating body 4 includes the hub 26, a bearing body 8, and a magnet 28. The rotating body 4 and the stationary body 2 include a lubrication medium that is a lubricant 20 continuously present in some gaps between the shaft body 6 and the bearing body 8. The shaft body 6, the bearing body 8, and the lubricant 20 form a fluid dynamic bearing mechanism 52 together with dynamic pressure generating grooves to be discussed later. The shaft body 6 is fixed to the chassis 24, while the bearing body 8 is fixed to the hub 26.

(Chassis)

The material of and the technique of forming the chassis 24 are not limited to any particular ones. In this embodiment, as an example, the chassis 24 is formed by die-casting of an aluminum alloy. The chassis 24 may be formed by, for example, pressing of a sheet metal, such as stainless steel or aluminum. In this case, the chassis 24 has a part including an embossed face formed by pressing. The chassis 24 may have a surface process layer like nickel plating. In addition, the chassis 24 may have a predetermined part like the outer circumference wall 24B formed of a non-metallic material like a resin. Still further, the chassis 24 may have a coating layer like an epoxy resin. The bottom plate 24A of the chassis 24 may be formed by laminating equal to or greater than two sheets.

The chassis 24 includes a protrusion 24E cylindrical around the rotation axis R as viewed from the top, and an inner circumference wall 24D provided at the center of the protrusion 24E. The protrusion 24E protrudes toward the hub 26 from the upper face of the bottom plate 24A. The stator core 32 is fixed to the outer circumference of the protrusion 24E, and the upper face of the protrusion 24E faces the hub 26 in the axial direction with a gap. The inner circumference wall 24D is formed in a cylindrical shape around the rotation axis R as viewed from the top. A sleeve encircling portion 18 that is a stationary portion of the fluid dynamic bearing mechanism 52 is fitted in the inner circumference wall 24D and is fixed thereto.

The bottom plate 24A of the chassis 24 includes an internal piece 24H provided at a nearby side to the rotation axis R in the radial direction, and an external piece 24G provided outwardly in the radial direction relative to the internal piece 24H. The internal piece 24H is engaged with an opening 24P provided in the external piece 24G, and is fixed thereto by press-fitting, welding, bonding or a combination thereof. The internal piece 24H faces the hub 26 in the axial direction, while the external piece 24G faces the magnetic recording disk 62 in the axial direction. The internal piece 24H and the external piece 24G can be formed of substantially same material. The internal piece 24H and the external piece 24G may be formed of different materials.

An annular recess 24N is provided in the internal piece 24H of the bottom plate 24A of the chassis 24 around the rotation axis R as viewed from the top. A part of a mount portion 26J of the hub 26 to be discussed later enters the recess 24N in the axial direction. The entering portion of the hub 26 is provided around the rotation axis R. The lower end face of the mount portion 26J of the hub 26 faces the upper face of the recess 24N of the chassis 24, and forms a gap 204. The gap 204 is set to be, for example, 0.02 to 0.5 mm, and extends in the radial direction.

An annular recess 24L concaved outwardly in the radial direction is provided in a side face of the internal piece 24H of the bottom plate 24A of the chassis 24 encircling the mount portion 26J with a gap. An annular extended portion 26L of the hub 26 to be discussed later enters the annular recess 24L in the radial direction. The gap between the annular recess 24L and the annular extended portion 26L forms a flexed labyrinth.

A gap between the upper face of the annular extended potion 26L and the annular recess 24L in the axial direction extends in the radial direction, and is set to be, for example, equal to or larger than 0.02 mm and equal to or smaller than 0.4 mm. A gap between an outer circumference of the annular extended portion 26L and the annular recess 24L in the axial direction extends in the axial direction, and is set to be, for example, equal to or larger than 0.02 mm and equal to or smaller than 0.4 mm. A gap between the lower face of the annular extended portion 26L and the annular recess 24L in the axial direction extends in the radial direction, and is set to be, for example, equal to or greater than 0.02 mm and equal to or smaller than 0.4 mm.

In this embodiment, provided in the lower face of the mount portion 26J of the hub 26 are gas dynamic pressure grooves 210 that generate dynamic pressure directing gas present between the hub 26 and the bottom plate 24A inwardly when the hub 26 rotates relative to the chassis 24. According to this structure, a dispersion of the vaporized lubricant 20 around the magnetic recording disk 62 can be prevented. The gas dynamic pressure grooves may be provided in the bottom plate 24A instead of the hub 26. In addition, the gas dynamic pressure grooves may be provided in either one of the surface of the annular recess 24L and the surface of the annular extended portion 26L, which surfaces face with each other. An example shape of the gas dynamic pressure grooves 210 employed is a spiral shape. The shape of the gas dynamic pressure grooves may be a herringbone shape or other shapes.

The gas dynamic pressure grooves 210 can be formed by pressing, ball rolling, electro-chemical etching, or cutting. A separate member having the gas dynamic pressure grooves 210 formed therein in advance may be fixed to the lower end of the mount portion 26J. Such a member can be formed by, for example, pressing of a metallic member, or molding of a resin material.

The annular recess 24L is provided in the gap between the external piece 24G and the internal piece 24H in the axial direction. In particular, the external piece 24G is provided with an annular projection 24J that extends toward the rotation axis R of the hub 26 in the radial direction. The annular projection 24J is formed so as to face the internal piece 24H in the axial direction. A gap between the annular projection 24J and the internal piece 24H forms the annular recess 24L.

The external piece 24G has an annular step 24Q provided in the inner circumferential side face, and the internal piece 24H has an annular boss 24R which is provided at the outer circumferential side face and which abuts the annular step 24Q. The annular step may be provided in the outer circumferential side face of the internal piece 24H.

In addition, the annular boss may be provided at the inner circumferential side face of the external piece 24G. When the annular boss 24R abuts the annular step 24Q, the positioning when the internal piece 24H and the external piece 24G are joined together becomes easy, thus reducing a manufacturing error.

An annular projection 24M that protrudes upwardly around the rotation axis R is provided on the outer circumference of the internal piece 24H. The upper face of the annular projection 24M abuts the annular projection 24J, and the outer circumferential side face of the annular projection 24M is engaged with the opening 24P. As to the external piece 24G and the internal piece 24H, a bond 38 is present between the inner circumference of the opening 24P and the outer circumference of the annular projection 24M. When the bond 38 is present in such a gap, the gap between the external piece 24G and the internal piece 24H is air-tightly sealed, and thus foreign particles, etc., are prevented from entering in the disk retaining space 70. In particular, bond reservoirs concaved in the axial direction are provided in the inner circumference of the opening 24P and outer circumference of the annular projection 24M, further improving the foreign-particle entrance prevention effect.

(Stator Core)

The stator core 32 includes an annular part and, for example, 12 salient poles extending from the annular part outwardly in the radial direction. The stator core 32 is formed by, for example, laminating five to 30 magnetic steel sheets each having a thickness of 0.1 to 0.65 mm, and integrating those sheets by caulking. In this embodiment, as an example, nine magnetic sheets each having a thickness of 0.2 mm are laminated. An insulation coating, such as electrodeposition coating or powder coating, is applied to the surface of the stator core 32.

The stator core 32 has the lower end of the inner circumference of the annular part engaged with the step provided at the protrusion 24E and seated therewith, and the inner circumference of the annular part is joined with the step of the protrusion 24E by press-fitting, bonding or a combination thereof. The protrusion 24E is formed in such a way that a ratio of the joined area of the protrusion 24E and the stator core 32 in the axial direction relative to the area of the inner circumference of the annular part of the stator core 32 becomes 50 to 90%. In this case, in comparison with the case in which such a ratio is smaller than 50%, a vibration of the stator core 32 can be suppressed.

(Coil)

The coils 30 are each formed by winding a conductor wire around each salient pole of the stator core 32 by a predetermined number of turns. The coil 30 generates a field magnetic field along the salient pole when a drive current is caused to flow through the coil 30. The conductor wire is formed by, for example, covering the surface of a wire core like soft copper with an insulation layer like a urethane resin. A lubrication material is applied to the surface of the conductor wire to reduce a frictional resistance. An example lubrication material is a polyamide compound.

(Hub)

The hub 26 includes a disk portion 26D extending outwardly in the radial direction, an annular portion 26E extending downwardly in the axial direction from the outer circumference of the disk portion 26D, the mount portion 26J extending outwardly in the radial direction from the lower outer circumference of the annular portion 26E, and an annular extended portion 26L like a flange extending further outwardly in the radial direction from the outer circumference of the mount portion 26J. The center hole of the disk-shape magnetic recording disk 62 is engaged with the annular portion 26E of the hub 26, and the magnetic recording disk 62 is mounted on the mount portion 26J. At least a part of the mount portion 26J enters the recess 24N provided in the bottom plate 24A of the chassis 24. The disk portion 26D is formed integrally with the bearing body 8.

The disk portion 26D and the annular portion 26E are joined together by press-fitting, welding, bonding or a combination thereof. A step 26M is provided in the joined face of either one of the disk portion 26D and the annular portion 26E, and an abutment 26N that abuts the step 26M with equal to or greater than three planes is provided at the other joined face. According to this structure, the disk portion 26D and the annular portion 26E can be precisely joined together.

The disk portion 26D, the annular portion 26E, the mount portion 26J, and the annular extended portion 26L are formed coaxially and annularly around the rotation axis R relative to each other. As a result, the hub 26 is formed in a substantially cup shape. The annular portion 26E, the mount portion 26J, and the annular extended portion 26L are formed integrally with each other. The hub 26 is formed of, for example, a non-ferrous material like an aluminum alloy, a ferrous material like stainless steel, or a resin material like liquid crystal polymer, or, a composite material thereof. The hub 26 may have a surface covering layer by coating or plating to suppress a peeling of the surface. The disk portion 26D and the annular portion 26E may be formed integrally with each other.

The hub 26 includes a hub protrusion 26Q in an annular shape as viewed from the top, provided at the center of the disk portion 26D, and protruding in the axial direction, and a clamp recess 26R concaved toward the rotation axis R from the outer circumferential side face of the hub protrusion 26Q. The hub protrusion 26Q is formed integrally with the disk portion 26D. The hub protrusion 26Q and the clamp recess 26R form a clamper catcher that fastens the clamper 78. By providing the clamp recess 26R, the clamper catcher has, as an example, a substantially circular truncated conical surface having a diameter gradually decreasing toward the bottom, and is formed in a substantially a wedge shape in the axial direction in a cross-sectional view. As an example, the clamp recess 26R is formed in a tapered shape having a width becoming narrow toward the back in a cross-sectional view. As an example, the clamp recess 26R is inclined toward the back in a cross-sectional view. The inclination angle relative to the rotation axis R is set to be, for example, 45 to 135 degrees.

(Spacer)

In order to separate the respective magnetic recording disks 62, the spacers 72 are provided. Each spacer 72 is in a hollow ring shape, and has the inner circumference engaged with the annular portion 26E. The spacer 72 is held between the lower magnetic recording disk 62 and the upper magnetic recording disk 62.

(Clamper)

In order to prevent the uppermost magnetic recording disk 62 from being detached from the hub 26, the clamper 78 is provided. The clamper 78 is in a hollow disk shape, and includes an inner circumference 78A and an outer circumference 78B. As an example, the inner circumference 78A of the clamper 78 includes a tapered surface having a width becoming narrow toward the tip in a cross-sectional view. As an example, the tapered surface of the inner circumference 78A is set to be a different angle from the inclination angle of the clamp recess 26R. This is because, as will be discussed later, when the inner circumference 78A of the clamper 78 is engaged with the clamp recess 26R and fastened thereto, the clamper 78 is prevented from being detached from the clamp recess 26R when the hub 26 rotates. The clamper 78 may have the inner circumference 78A formed with a bent portion bent along the inclination of the cross-section of the clamp recess 26R. The inner circumference 78A of the clamper 78 is fitted with the clamp recess 26R of the clamper catcher provided at the upper face of the disk portion 26D, and fastened thereto. Since the outer circumference 78B holds the uppermost magnetic recording disk 62, the clamper 78 prevents the magnetic recording disks 62 from being detached from the hub 26. As an example, the clamper 78 is formed in a predetermined shape by pressing a metallic material like stainless steel. A surface process like electroless nickel plating may be performed.

The way of fastening the clamper 78 to the hub 26 is not limited to the above-explained structure, and for example, the inner circumference 78A of the clamper 78 may be fastened to the outer circumference of the annular portion 26E of the hub 26.

(Magnet)

The magnet 28 is a hollow ring, and has, for example, an outer circumference bonded to the inner circumference of the annular portion 26E. The magnet 28 has an upper face contacting the disk portion 26D. The magnet 28 is formed of, for example, a ferrite-based magnetic material or a rare-earth magnetic material. The magnet 28 contains a resin like polyamide as a binder. A surface layer formed by, for example, electrodeposition coating or a spray painting is formed on the surface of the magnet 28. The surface layer suppresses an oxidization of the magnet 28, or suppresses a peeling of the surface of the magnet 28. For example, 12 magnetic poles are provided on the inner circumference of the magnet 28 in the circumferential direction, and the inner circumference of the magnet 28 faces with the outer circumferences of the salient poles of the core 32 in the radial direction with respective gaps.

(Fluid Dynamic Bearing Mechanism)

The shaft body 6, the bearing body 8, and the lubricant 20 form a fluid dynamic bearing mechanism 52. The fluid dynamic bearing mechanism 52 includes gas-liquid interfaces of the lubricant 20 in a gap between the shaft body 6 and the bearing body 8. In particular, a first gas-liquid interface 124 is present in an area opened to the upper space of the hub 26, and a second gas-liquid interface 122 is present in an area held between the chassis 24 and the sleeve 42.

(Shaft Body)

The shaft body 6 includes the shaft 110, atop flange 12, and a shaft holder 112. The shaft 110, the top flange 12, and the shaft holder 112 are formed annularly around the rotation axis R.

(Shaft)

The shaft 110 is a substantially cylindrical member extending in the axial direction along the rotation axis R, and has a retainer hole 110A provided in the one end and retaining a fastener like the screw 74, and has a joint hole 110B extending upwardly and provided in the other end.

(Top Flange)

The top flange 12 is a substantially disk-shape member elongated outwardly in the radial direction from the outer circumference of the one-end side of the shaft 110, and faces the upper face of the sleeve 42 with a gap in the axial direction. The outer circumference of the top flange 12 includes a tapered surface having a distance from the rotation axis R in the radial direction becoming large as coming close to the chassis 24. The top flange 12 is encircled by a flange encircling portion 136 to be discussed later.

The shaft 110 and the top flange 12 are formed integrally with each other by cutting, machining and grinding of a ferrous material like stainless steel, such as SUS 420 J2. The integral formation reduces the manufacturing error of the shaft 110 and that of the top flange 12, and eliminates a joining work of those pieces. The top flange 12 and the shaft 110 may be formed as separate pieces depending on the application and the limitation over designing. The shaft 110 may be quenched to increase the hardness.

(Shaft Holder)

The shaft holder 112 includes a joint portion 34, a flange 16, and the sleeve encircling portion 18. The joint portion 34, the flange 16, and the sleeve encircling portion 18 are formed annularly around the rotation axis R. The joint portion 34 is a substantially cylindrical member extending upwardly along the rotation axis R, is fitted in the joint hole 110B of the shaft 110, and is joined therewith by bonding, press-fitting or a combination thereof. The flange 16 is a member in a substantially disk shape spreading in the radial direction from the outer circumference of the joint portion 34, and faces the lower face of the sleeve 42 with a gap in the axial direction. The sleeve encircling portion 18 is a substantially hollow-cylindrical member protruding upwardly from the upper face of the flange 16, and encircles the outer circumference of the sleeve 42 with a gap.

How to join the joint portion 34 with the joint hole 110B is not limited to the above-explained structure, and for example, screw threads may be formed in the outer circumference of the joint portion 34 and the inner circumference of the joint hole 110B, and both may be joined together by screwing.

The joint portion 34, the flange 16, and the sleeve encircling portion 18 are formed integrally one another by cutting, machining and grinding of a ferrous material like stainless steel, such as SUS 430 or SUS 303. The integral formation reduces the manufacturing error of the joined components in comparison with a case in which those components are formed separately, eliminates a joining work, and suppresses a deformation due to shock load. The joint portion 34, the flange 16, and the sleeve encircling portion 18 may be formed separately depending on the application and the limitation over designing, may be formed of other metallic materials like brass or other materials like a resin, and may be formed by other techniques, such as pressing and molding.

(Bearing Body)

The bearing body 8 includes the sleeve 42, the flange encircling portion 136, a seal-circumscribing portion 42B, and a communication channel BP. The sleeve 42, the flange 136, and the seal-circumscribing portion 42B are formed annularly around the rotation axis R.

(Sleeve)

The sleeve 42 is a substantially cylindrical member, and encircles the middle portion of the shaft 110 with a gap. The upper face of the sleeve 42 faces the top flange 12 with a gap in the axial direction. The lower face of the sleeve 42 faces the flange 16 with a gap in the axial direction. A pair of radial dynamic pressure bearings distant from each other in the axial direction is provided in the gap between the inner circumference of the sleeve 42 and the shaft 110. Radial dynamic pressure generating grooves 50 that generate radial dynamic pressure are provided in areas of the inner circumference of the sleeve 42 corresponding to the radial dynamic pressure bearings. The radial dynamic pressure generating grooves 50 may be provided in the outer circumference of the shaft 110 instead of the sleeve 42.

(Flange Encircling Portion)

The flange encircling portion 136 is a hollow-ring member as viewed from the top and provided at the upper portion of the sleeve 42, and encircles the outer circumference of the top flange 12 with a gap. A tapered space gradually becoming widespread toward the upper space is provided in the gap between the inner circumference of the flange encircling portion 136 and the outer circumference of the top flange 12 in the radial direction. The first gas-liquid interface 124 of the lubricant 20 contacts the gap between the inner circumference of the flange encircling portion 136 and the outer circumference of the top flange 12 in the radial direction, and thus a first capillary seal that suppresses a spilling of the lubricant 20 by capillary force is formed.

(Seal-Circumscribing Portion)

The seal-circumscribing portion 42B is a ring member as viewed from the top and provided at the lower outer circumference of the sleeve 42, and is encircled by the sleeve encircling portion 18 with the gap. The gap in the radial direction between the outer circumference of the seal-circumscribing portion 42B and the inner circumference of the sleeve encircling portion 18 forms a tapered space gradually becoming widespread toward the upper space. The second gas-liquid interface 122 of the lubricant 20 contacts the gap in the radial direction between the outer circumference of the seal-circumscribing portion 42B and the inner circumference of the sleeve encircling portion 18, and thus a second capillary seal that suppresses a spilling of the lubricant 20 by capillary force is formed.

(Communication Channel)

In order to reduce a pressure difference between areas where the lubricant 20 is filled, the communication channel is provided. As an example, the communication channel BP is a through-hole extending in the axial direction between the one end face of the sleeve 42 and the other end face thereof. The communication channel BP is in communication with the area of the sleeve 42 facing the top flange 12 and the area facing the flange 16 to reduce a pressure difference. The communication channel BP is formed by, for example, drilling.

The sleeve 42, the flange encircling portion 136, and the seal-circumscribing portion 42B are formed integrally one another by cutting, machining and grinding a ferrous material like stainless steel, such as SUS 430 or SUS 303. The integral formation reduces the manufacturing error of joined components in comparison with a case in which those are formed separately and joined later, eliminates a joining work, and suppresses a deformation due to shock load. The sleeve 42, the flange encircling portion 136, and the seal-circumscribing portion 42B may be formed separately depending on the application and the limitation over designing, may be formed of other metallic materials like brass or other materials like a resin, and may be formed by other techniques, such as pressing and molding. The bearing body 8 may include a surface layer formed by, for example, electroless nickel plating.

The sleeve 42 is formed integrally with the hub 26. The integral formation reduces the manufacturing error of the joined components in comparison with a case in which those are formed separately and joined later, eliminates a joining work, and suppresses a deformation due to shock load. Those may be formed separately depending on the application and the limitation over designing.

(Thrust Opposing Portion)

A first thrust opposing portion is provided in a gap in the axial direction between the lower face of the top flange 12 and the upper face of the sleeve 42. First thrust dynamic pressure generating grooves 54 are provided in the area of the sleeve 42 corresponding to the first thrust opposing portion. The first thrust dynamic pressure generating grooves 54 may be provided in the lower face of the top flange 12 instead of the sleeve 42.

A second thrust opposing portion is provided in a gap in the axial direction between the upper face of the flange 16 and the lower face of the sleeve 42. Second thrust dynamic pressure generating grooves 54 are provided in the area of the sleeve 42 corresponding to the second thrust opposing portion. The second thrust dynamic pressure generating grooves 54 may be provided in the upper face of the flange 16 instead of the sleeve 42.

(Dynamic Pressure Generating Grooves)

The radial dynamic pressure generating grooves 50 are formed in, for example, a herringbone shape, but may be formed in other shapes like a spiral shape. The thrust dynamic pressure generating grooves 54 are formed in, for example, a spiral shape, but may be formed in other shapes like a herringbone shape. Those dynamic pressure generating grooves 50, 54 are formed by, for example, pressing, ball rolling, electro-chemical machining, or cutting. Those dynamic pressure generating grooves 50, 54 may be formed by different techniques from each other.

(Ring)

As an example, the ring 132 is disposed in a space interconnecting the first gas-liquid interface 124 of the lubricant 20 with the disk retaining space 70. The ring 132 is an annular member as viewed from the top around the rotation axis R, and is formed by a predetermined process using a metallic material like stainless steel, such as SUS 303, or a resin material. The ring 132 is fastened to the upper face of the flange encircling portion 136 by, for example, bonding or double-faced tape. The outer circumference of the ring 132 is bonded to the inner circumference of the opening of the hub 26. The ring 132 suppresses a diffusion of the vaporized lubricant 20 from the first gas-liquid interface 124, and prevents the vaporized lubricant 20 from reaching the disk retaining space 70. The ring 132 is provided with a hollow with an opened top, and the capturer 134 to be discussed later is retained in this hollow. The ring 132 may be provided on the upper face of the top flange 12 of the stationary body 2. In this case, for example, the outer circumference of the ring 132 is bonded to the outer circumference of the shaft 110 so as not to hit the inner circumference of the opening of the hub 26, and the lower face of the ring 132 abuts the upper face of the top flange 12 so as not to hit the upper face of the flange encircling portion 136.

(Capturer)

The capturer that captures the vaporized lubricant in the space interconnecting the gas-liquid interface of the lubricant 20 and the disk retaining space 70 is provided. As an example, the capturer 134 is provided in the space interconnecting the first gas-liquid interface 124 of the lubricant 20 and the disk retaining space 70. The capturer 134 captures the mists of spilled lubricant 20 from the first gas-liquid interface 124 and the volatile components thereof, and prevents those from sticking to the magnetic recording disk 62. A charcoal filter is retained in the hollow of the ring 132, thereby forming the capturer 134. A porous material or other filters may be utilized as the capturer 134. The upper face of the capturer 134 is covered by the top cover 22 with a narrow gap. The capturer 134 may be provided on the upper face of the top flange 12 of the stationary body 2. The location of the capturer is not limited to the space interconnecting the first gas-liquid interface 124 with the disk retaining space 70, and may be provided in any arbitrary location in the space interconnecting the second gas-liquid interface 122 with the disk retaining space 70, e.g., the gap between the sleeve encircling portion 18 and the seal circumscribing portion 42B so as not to disturb a rotation of the sleeve 42, i.e., the hub 26.

(Lubricant)

An explanation will be given of the lubricant. The lubricant 20 of this embodiment is, for example, an ester-based base oil added with a fluorescent material. Example fluorescent materials applicable are various fluorescent materials including an inorganic substance and an organic substance. As an example, the lubricant 20 of this embodiment is added with a fluorescent material that is fluorescein. When irradiated with ultraviolet rays having a shorter wavelength than that of visible light, fluorescein emits visible light of green spectra by photoluminescence phenomenon.

The containing rate of the fluorescent material in the lubricant can be set to, for example, equal to or greater than 0.001 wt %, more preferably, equal to or greater than 0.01 wt %. When the containing rate of the fluorescent material in the lubricant increases, the costs of the lubricant also increase. Hence, it is preferable that the containing rate of the fluorescent material should be equal to or less than 1 wt %.

The lubricant 20 is continuously present in the gaps between the bearing body 8 and the shaft body 6 from the first gas-liquid interface 124 to the second gas-liquid interface 122. More specifically, the lubricant 20 is continuously charged in the gap in the radial direction between the inner circumference of the flange encircling portion 136 and the outer circumference of the top flange 12, the gap in the axial direction between the top flange 12 and the sleeve 42, the gap in the axial direction between the sleeve 42 and the shaft 110, the gap in the axial direction between the sleeve 42 and the flange 16, the gap in the radial direction between the seal-circumscribing portion 42B and the sleeve encircling portion 18, and the communication channel BP.

An explanation will now be given of the operation of the fluid dynamic bearing mechanism 52. When the bearing body 8 rotates relative to the shaft body 6, the radial dynamic pressure generating grooves 50 and the thrust dynamic pressure generating grooves 54 generate dynamic pressures to the lubricant 20. Such dynamic pressures support the rotating body 4 connected to the bearing body 8 in the radial direction and the axial direction so as not to contact the stationary body 2 connected to the shaft body 6.

An explanation will now be given of an operation of the disk drive device 100 employing the above-explained structure. Three-phase drive currents are applied to the coils 30 to rotate the magnetic recording disks 62. When such drive currents flow through the respective coils 30, field magnetic fluxes are generated along the respective salient poles of the stator core 32. The mutual interaction of those field magnetic fluxes and the magnetic fluxes of the drive magnetic poles of the magnet 28 apply torque to the magnet 28, and thus the hub 26 and the magnetic recording disks 62 engaged therewith start rotating. While at the same time, when the voice coil motor 66 causes the swing arm 64 to swing, the recording/playing head goes out and comes in the swingable range over the magnetic recording disk 62. The recording/playing head converts magnetic data recorded in the magnetic recording disk 62 into electrical signals, and transmits the signals to a control board (unillustrated), or writes data transmitted in the form of electrical signals from the control board in the magnetic recording disk 62 as magnetic data.

The disk drive device 100 of this embodiment employing the above-explained structure accomplishes the following advantages.

According to the disk drive device 100, the annular extended portion 26L enters in the radial direction the annular recess 24L to form a flexed labyrinth. Hence, it is possible for the disk drive device 100 to prevent the volatile components of the spilled lubricant 20 from the second gas-liquid interface 122, and the mists of the lubricant 20 from reaching the disk retaining space 70.

According to the disk drive device 100, the external piece 24G and the internal piece 24H formed separately are employed, and thus the annular recess 24L can be easily formed between the external piece 24G and the internal piece 24H.

The disk portion 26D and the annular portion 26E may be formed integrally with each other. According to the hub having the disk portion and the annular portion formed integrally, however, like the hub 92 illustrated in FIG. 8 of JP H09-512330 A, due to a process constraint, a corner C is formed at an internal edge part. Hence, the magnet is attached to a position in such a way that the upper end edge of the magnet does not interfere with the corner C. As a result, the gap between the magnet and the disk portion becomes large, which is disadvantageous for thinning of the disk drive device by what corresponds to such a structure. In addition, a recess in the radial direction may be formed in the annular portion to avoid an interference with the corner C (see peripheral wall 8c in FIG. 1 of JP 2008-275074 A). When, however, the recess is formed, the strength of the peripheral wall at the recess portion is reduced.

In contrast, according to the disk drive device 100, the disk portion 26D and the annular portion 26E formed separately are joined together, and thus no corner C is formed inwardly relative to the joined edge of the disk portion 26D and the annular portion 26E. Hence, the disk drive device 100 facilitates a thinning, but avoids a reduction of the strength. Moreover, there is no adverse effect inherent to the corner C, the precision of the attaching position of the magnet 28 can be improved, and a magnet long in the axial direction by what corresponds to an elimination of the corner C can be employed. Still further, by forming the disk portion 26D and the annular portion 26E separately, different materials, different process conditions or different processing techniques appropriate for respective components can be applied.

According to the disk drive device 100, the inner circumference 78A of the clamper 78 is fitted in the clamp recess 26R of the clamper catcher of the hub 26 and fastened thereto. Hence, it is unnecessary to use a fastener such as a screw, and thus the disk drive device can be made thinner.

According to the disk drive device 100, the top flange 12 is formed integrally with the shaft 110. Hence, the possibility that the top flange 12 is detached from the shaft 110 can be reduced, and a reduction of the joining strength of the top flange 12 and the shaft 110 when the disk drive device 100 is in use can be prevented.

According to the disk drive device 100, the lubricant 20 contains the fluorescent material. Hence, when the lubricant 20 is applied to an unintended portion in the manufacturing process, if the disk drive device 100 is irradiated with light with a predetermined wavelength, the lubricant can be easily detected. In addition, when the lubricant 20 is leaking from the gap between the components, such a leakage can be easily detected.

According to the disk drive device 100, the ring 132 and the capturer 134 are provided in the space interconnecting the first gas-liquid interface 124 of the lubricant 20 with the disk retaining space 70. Therefore, a contamination of the disk retaining space 70 by the vaporized lubricant 20 can be prevented.

In addition, the capturer 134 is retained in the hollow of the ring 132, and thus the space to place the capturer 134 can be saved. Therefore, the disk drive device can be made thin by what corresponds to the space saving.

The structure of the disk drive device and the operation thereof were explained in the aforementioned embodiment. However, those are merely examples, and a combination of the respective components permits various developments, and it should be understood by those skilled in the art that such a structure and the following modified examples are within the scope and spirit of the present disclosure without departing therefrom.

According to the embodiment, the explanation was given of the case in which the rotating body 4 is joined with the bearing body 8, and the shaft body 6 is joined with the stationary body 2, but the present disclosure is not limited to this case. The rotating body 4 may be joined with the shaft body 6, and the bearing body 8 may be joined with the stationary body 2.

According to the embodiment, although the explanation was given of the case in which the retainer hole 110A and the joint hole 110B are no in communication with each other, the present disclosure is not limited to this case. The retainer hole 110A and the joint hole 110B may be in communication with each other.

According to the embodiment, the explanation was given of the case in which, as to the bottom plate 24A, the internal piece 24H and the external piece 24G are separate pieces, but the present disclosure is not limited to this case.

The internal piece 24H and the external piece 24G may be formed integrally with each other.

According to the embodiment, although the explanation was given of the case in which, as to the hub 26, the disk portion 26D and the annular portion 26E are separate components, the present disclosure is not limited to this case. The disk portion 26D and the annular portion 26E may be formed integrally with each other.

According to the embodiment, the explanation was given of the structure in which the stator core is encircled by the magnet, but the present disclosure is not limited to this structure. For example, the magnet may be encircled by the stator core.

According to the embodiment, although the explanation was given of the case in which the first thrust dynamic pressure generating grooves 54 are provided in the upper face of the sleeve 42, the present disclosure is not limited to this case. A structure in which no thrust dynamic pressure generating groove is formed may be employed.

The gas dynamic pressure generating grooves 210 may be provided at a position closer to the second gas-liquid interface 122 than that of the aforementioned embodiment. As an example, the gas dynamic pressure generating grooves may be provided in the portion of the inner circumference of the hub 26 facing the protrusion 24E.

According to the embodiment, the explanation was given of the case in which the joint 34 of the shaft holder 112 is fitted in the joint hole 110B of the shaft 110, and those are joined together, but the present invention is not limited to this structure. The shaft holder may be provided with a hole, and the shaft 110 may be fitted in this hole.

According to the embodiment, the explanation was given of the case in which the shaft 110 and the shaft holder 112 are separate components, but the present disclosure is not limited to this case. The shaft 110 and the shaft holder 112 may be formed integrally with each other.

What is claimed is:

1. A disk drive device comprising:
   a chassis;
   an annular hub on which a recording disk is mountable;
   a fluid dynamic bearing mechanism that supports the hub freely rotatable relative to the chassis;
   an annular extended portion extending outwardly in a radial direction from the hub; and
   an annular recess which is provided in the chassis and where the annular extended portion at least partially enters in the radial direction,
   wherein a gap between the annular recess and the annular extended portion includes a portion that forms a flexed labyrinth in a cross-sectional view,
   wherein the chassis comprises:
      an internal piece provided at a near side to a rotation axis in the radial direction and facing the hub in an axial direction; and
      an external piece provided at a distant side to the rotation axis and outwardly in the radial direction relative to the internal piece as a separate piece therefrom, and facing the recording disk in the axial direction, and
   wherein the annular recess is provided between the internal piece and the external piece.

2. The disk drive device according to claim 1, wherein the gap between the annular recess and the annular extended portion is equal to or larger than 0.02 mm and equal to or smaller than 0.4 mm.

3. The disk drive device according to claim 1, wherein one of a surface of the annular recess and a surface of the annular extended portion facing with each other is provided with a gas dynamic pressure groove that generates, in a direction toward the fluid dynamic bearing mechanism, dynamic pressure to a gas present between the annular recess and the annular extended portion when the hub rotates relative to the chassis.

4. The disk drive device according to claim 1, wherein the external piece comprises an annular projection protruding toward the rotation axis of the hub and facing the internal piece in the axial direction.

5. The disk drive device according to claim 1, wherein the internal piece comprises:
   an annular protrusion protruding toward the hub and encircling the fluid dynamic bearing mechanism; and
   a bearing hole which is encircled by the annular protrusion and where the fluid dynamic bearing mechanism enters.

6. The disk drive device according to claim 1, wherein a bond is present between the internal piece and the external piece.

7. The disk drive device according to claim 1, wherein:
   an annular step is provided at a side face of one of the external piece and the internal piece; and
   an annular boss that abuts the annular step is provided at a side face of other one of the external piece and the internal piece.

8. The disk drive device according to claim 1, wherein the hub comprises:
   a clamper catcher provided at a center of the hub around a rotation axis and formed in a substantially wedge shape in a cross-sectional view; and
   a clamper fastened to the clamper catcher to retain the recording disk mounted on the hub.

9. The disk drive device according to claim 8, wherein:
   the clamper catcher is formed in a substantially wedge shape in a cross-sectional view in an axial direction; and
   the clamper has an inner circumference fitted with a recess forming the wedge shape, thereby being fastened to the clamper catcher.

10. The disk drive device according to claim 9, wherein:
    the inner circumference of the clamper includes a tapered face along the recess of the clamper in a cross-sectional view; and
    an inclination angle of the recess forming the wedge shape of the clamper catcher in a cross-sectional view is different from an inclination angle of the tapered face of the inner circumference of the clamper in a cross-sectional view.

11. The disk drive device according to claim 1, wherein:
    the fluid dynamic bearing mechanism comprises:
    a shaft body fixed to the chassis;
    a rotating body rotatable relative to the shaft body; and
    a lubricant charged between the shaft body and the rotating body; and
    the disk drive device further comprises a capturer provided above a gas-liquid interface of the lubricant to capture a spilled and vaporized lubricant from the gas-liquid interface.

12. The disk drive device according to claim 11, wherein:
    the shaft body comprises a shaft extending in an axial direction, and a top flange provided at one-end side of the shaft and extending in the radial direction;
    the rotating body comprises a sleeve encircling the shaft between the top flange and another end of the shaft in the axial direction, and the hub including a flange encircling portion fixed to the sleeve and facing the top flange with a gap in the radial direction;
    the gas-liquid interface of the lubricant is formed in the gap in the radial direction between the top flange and the flange encircling portion; and
    the capturer comprises a ring provided in an upper space of the gap in the radial direction between the flange and the flange encircling portion, and formed in a hollow annular shape as viewed from a top, and, a filter disposed in the hollow.

13. The disk drive device according to claim 12, wherein the ring is fastened to an upper face of the flange encircling portion.

14. The disk drive device according to claim 1, wherein:
    the hub comprises a disk portion in a disk shape extending outwardly in a radial direction relative to a center axis of the fluid dynamic bearing mechanism, and an annular portion formed as a separate annular component from the disk portion and extending toward the chassis in an axial direction from an outer circumference of the disk portion;

a joined face of one of the disk portion and the annular portion is formed with a step extending in the radial direction; and another joined face of the other one of the disk portion and the annular portion is provided with a catching part that abuts the step.

15. The disk drive device according to claim 14, wherein the step and the abutment contact with equal to or greater than three planes, and joined with each other.

16. The disk drive device according to claim 14, wherein the step and the abutment are joined with each other by press-fitting, welding, bonding or a combination thereof.

17. The disk drive device according to claim 14, further comprising an annular magnet provided on an inner circumference of the annular portion, wherein the magnet abuts an inner circumference of the disk portion with a flat plane in an axial direction.

18. The disk drive device according to claim 14, wherein the disk portion and the annular portion are formed of different materials.

19. The disk drive device according to claim 14, wherein the disk portion and the annular portion are formed under different process conditions.

* * * * *